Dec. 6, 1966 L. W. BELL 3,289,522

WASHER ASSEMBLY WITH FASTENER

Filed Nov. 30, 1964

INVENTOR.
LEWIS WALTER BELL
BY
Brumbaugh, Free, Graves & Donohue
his ATTORNEYS

United States Patent Office 3,289,522
Patented Dec. 6, 1966

3,289,522
WASHER ASSEMBLY WITH FASTENER
Lewis Walter Bell, Monroe, N.Y., assignor to Star Expansion Industries Corporation, Mountainville, N.Y., a corporation of Delaware
Filed Nov. 30, 1964, Ser. No. 414,828
8 Claims. (Cl. 85—10)

This invention relates to pointed fasteners adapted to be mounted in masonry or the like by hammer-driven or power-actuated tools and, more particularly, to a new and improved arrangement for supporting a washer on such fasteners.

Metal fasteners which are driven into masonry or the like are usually provided with a metal washer which is frictionally retained on the shank near the forward end of the fastener. This washer not only prevents spalling of masonry but also gives the fastener in effect a larger diameter head so that it will not tear sheet metal through which it is driven, for example. If the washer is retained too far from the forward end of the fastener, however, the spalling of masonry into which the fastener is driven will take place before the washer engages the workpiece during driving. On the other hand, if the washer is mounted on the tapered forward end of the fastener, the central hole on the washer will be so small that a major part of the driving force is exerted in driving the fastener through the washer. Furthermore, short fasteners frequently are not held in proper alignment in the bore of a fastener driving tool because an enlarged counterbore is required therein to receive the washer. If a fastener is driven when not held in proper alignment, the piston of the driving tool may be bent or broken and the fastener may form a "fish hook" when driven, thereby destroying its usefulness and damaging the workpiece.

Accordingly, it is an object of the present invention to provide a new and improved washer assembly for fasteners which overcomes the above-mentioned disadvantages.

An additional object of the invention is to provide a new and improved washer assembly for fasteners which does not require that the fastener driving tool be provided with a deep counterbore to receive the washer.

Another object of the invention is to provide a new and improved support for mounting a washer on a fastener which effectively disintegrates when the fastener is driven.

A further object of the invention is to provide a new and improved support for holding a fastener in alignment with the bore of a driving tool while it is driven.

These and other objects of the invention are attained by providing a destructible holder for a washer, the holder being shaped to fit over the pointed end of a fastener to support the washer near the pointed end without requiring a reduced diameter opening in the washer. Preferably, the holder extends rearwardly on the fastener and, at its rear end, it includes deformable lateral projections which engage the bore of the driving tool to hold the fastener in aligned position. In a preferred embodiment, the holder is made of a plastic material and has longitudinal slots on opposite sides to facilitate disintegration during driving. Moreover, the washer preferably has an irregularly shaped central opening so that a selected portion of the driving force is transmitted to it as the point passes through it, thereby providing sufficient engaging pressure to prevent spalling. Also, since the washer is held at the forward end of the fastener, it may be received in a shallow countersink at the forward end of the tool.

Further objects and advantages of the invention will be apparent from a reading of the following description in conjunction with the accompanying drawings, in which.

Figure 1:
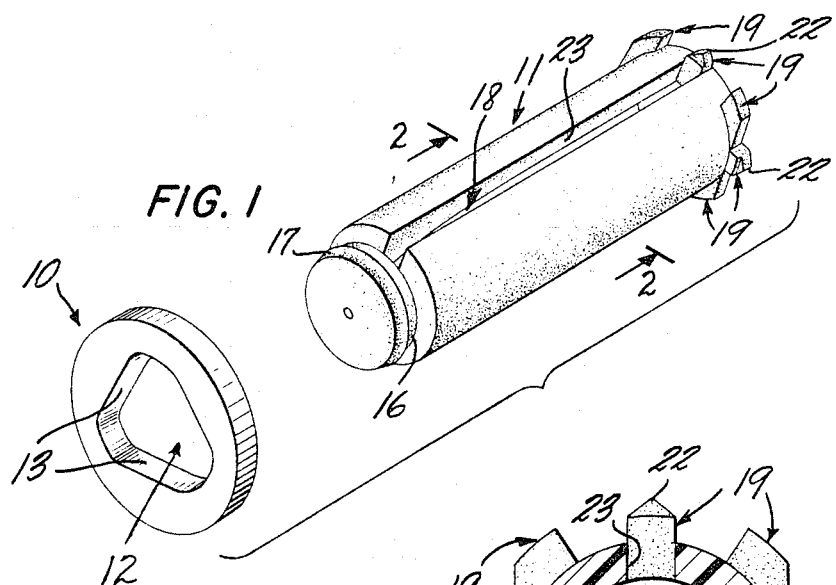
FIG. 1 is a magnified and exploded view showing a typical washer assembly according to the invention.
Figure 2:
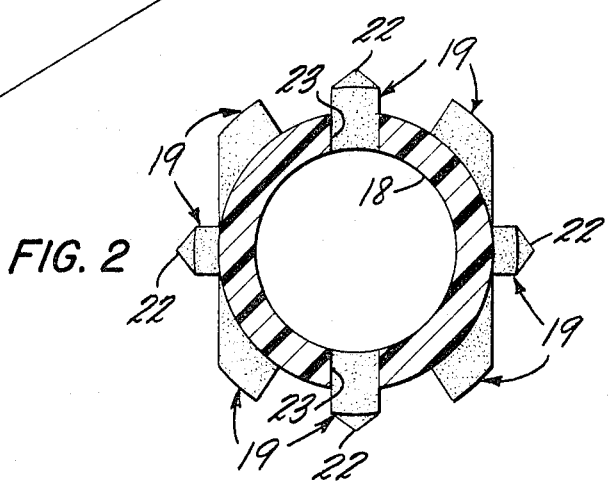
FIG. 2 is a view in cross-section taken along the line 2—2 of FIG. 1 and looking in the direction of the arrows.

In the representative embodiment of the invention shown in the drawings, the washer assembly comprises a steel washer 10 and a washer holder 11 made of a deformable plastic material such as polyethylene. The material of which a holder is made, however, may be any material which is sufficiently rigid to maintain its shape and retain the washer and also is destructible under sufficient pressure so as to break apart when a fastener upon which it is maintained is driven. In addition, the material is preferably slightly resilient so as to be deformed by engagement with the bore of the tool.

The washer 10 has a central opening 12 which is preferably of non-circular shape and, in the illustrated embodiment, the opening is triangular with the sides 13 dimensioned so that the tapered tip 14 of a fastener 15 (FIG. 3), with which it is used, will engage the sides 13 before the shank of the fastener reaches the washer. In this way, a selected portion of the driving force is applied through the washer 10 to the workpiece as the fastener is driven to avoid spalling but, because of the irregular shape of the opening, the resistance of the washer to passage of the fastener 15 is not great enough to substantially impede fastener driving.

At its forward end, the holder 11 has an annular recess 16 and a beveled projecting rim 17 so that the washer 10 may be resiliently snapped into place over the beveled rim 17 to be received in the recess 16. Rearwardly of the recess, the body of the holder 11 has an internal opening 18 which is preferably tapered at the forward end to fit the tapered tip 14 of the fastener and, at the rear end of the holder, a plurality of angularly spaced lateral projections 19 is provided, the diameter across these projections being slightly greater than the bore 20 of the barrel 21 (FIG. 3) in which the fastener is driven. In addition, certain of the projections 19 have triangular extensions 22 of reduced thickness to facilitate frictional engagement of the bore 20 without requiring excessive force for insertion in the bore.

Finally, the holder 11 is formed with longitudinal slots 23 on opposite sides extending from the annular recess 16 to the rear projections 19 so that when the fastener is driven, it will break apart readily and the fragments will be easily removed from the workpiece. If desired, the slots 23 may be extended all the way through the front end of the holder to facilitate breakup, since the front end is held together by the washer 10.

Figure 3:
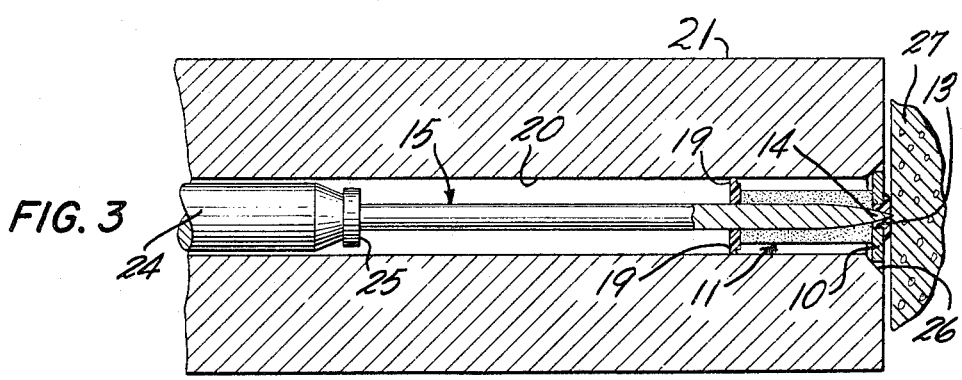
FIG. 3 is a view in longitudinal section on a reduced scale illustrating the washer assembly mounted on a fastener.

As illustrated in FIG. 3, the fastener 15, with a washer assembly consisting of the washer 10 and the holder 11 maintained on the forward end, may be inserted in the muzzle end of the bore 20 of a fastener driving tool. In the illustrated embodiment, the tool is of the piston type having a piston projection 24 extending into the bore 20 to drive the fastener 15. In this regard, it will be observed that even though the diameter of the fastener head 25 is smaller than the bore 20 of the barrel 21, the fastener is nevertheless held in aligned position in the bore by engagement of the projections 19 and the extensions 22 with the barrel bore and by centralization of the washer 10 at the forward end of the barrel. To assure proper centralization of the washer, a countersink recess 26 is preferably provided in the front end of the barrel to receive the washer so that when the driving tool and fastener are pressed against the surface of a workpiece 27, the washer 10 is held against the conical side of the countersink to center the forward end of the fastener.

In operation, the fastener 15, the washer 10 and the holder 11, assembled as illustrated in FIG. 3, are inserted into the muzzle end of the bore 20 of a fastener driving tool and the barrel 21 is pressed against the surface of the workpiece 27 so that the washer is held centered in the countersink 26. When the piston 24 is driven forward by operation of the tool, the forward end 14 of the fastener 15 engages the sides 13 of the triangular opening in the washer 10, thereby urging the washer against the workpiece to avoid spalling. As the fastener is driven farther, the sides 13 of the washer opening are deformed so that the shank of the fastener passes through the opening and into the workpiece. At the same time, the plastic holder 11, which still retains the fastener in centralized position in the bore 20, splits open along the slots 23 so that when the fastener has been driven completely and the barrel 21 is withdrawn from the workpiece, the two halves or smaller fragments of the plastic holder 11 may be easily removed from the fastener and the workpiece. In fact, the split halves of the plastic generally are blasted out of the way due to the force transmitted to the washer. In this connection, it will be noted that the portion of the holder forming the rim 17 at the forward end, being deformable, is flattened out beneath the washer and may be forced into and through the largest extensions of the opening therein prior to complete driving of the fastener, so that little or no plastic material is interposed between the washer 10 and the workpiece 27.

It will be apparent from the foregoing that the present invention provides a washer assembly which assures proper alignment of the fastener, improves the ability of the washer to prevent spalling and eliminates the necessity for a deep counterbore and detent arrangement in the driving tool to receive the washer.

Although the invention has been described herein with reference to a specific embodiment, many modifications and variations therein will readily occur to those skilled in the art. Accordingly, all such variations and modifications are included within the intended scope of the invention as defined by the following claims.

I claim:

1. In combination with a fastener having a given hardness adapted to be driven from the barrel of a driving tool and having a tapered forward end, a shank portion rearwardly thereof, and a head portion, a holder of considerably less hardness than said fastener assembled to the forward end of the fastener, said holder comprising a generally tubular portion having a substantially central bore therein extending at least half the axial length of said holder, said bore being so shaped as to be retained on at least the tapered portion of said fastener in substantial axial alignment therewith and in which at least the tapered end of the fastener is received, and means on said holder adjacent the tapered end of said fastener mounting a washer thereon in assembled relation thereto, said washer being rigid in a radial direction relative to the holder and having a substantially centrally located aperture therein of a size to be retained on said shank portion by said head portion when said fastener is driven into a workpiece.

2. The combination according to claim 1 wherein the washer has an outer diameter greater than that of the head portion of the shank.

3. The combination according to claim 1 wherein the generally tubular holder portion is made of synthetic resinous material.

4. The combination according to claim 1 wherein the washer is separable from the generally tubular holder portion and the holder portion is provided with a reduced radial portion at its forward end to receive the washer.

5. The combination according to claim 4 including a radially projecting rim of a diameter greater than the minimum dimension of the aperture in said washer, the rim being bevelled inwardly in the direction away from the shank portion of the fastener to facilitate mounting of the washer on the tubular holder portion.

6. The combination according to claim 1 wherein the tubular holder portion includes means adjacent the shank receiving end projecting in a substantially radial direction to provide resilient alignment and retention support for said fastener when placed in the bore of a driving tool.

7. The combination according to claim 1 wherein the tubular holder portion has at least one longitudinally extending slot located intermediate the ends thereof to facilitate breakup of the tubular portion when the fastener is driven.

8. The combination according to claim 1 wherein the tubular holder portion is formed to extend at least part way up the tapered end of the fastener so as to permit projection of the end from the holder.

References Cited by the Examiner
UNITED STATES PATENTS

| | | | |
|---|---|---|---|
| 2,638,051 | 5/1953 | Critchfield | 102—93 |
| 2,761,348 | 9/1956 | Williams et al. | |
| 2,968,984 | 1/1961 | De Caro. | |
| 3,085,613 | 4/1963 | Carpenter | 85—84 |

CARL W. TOMLIN, *Primary Examiner.*

R. S. BRITTS, *Assistant Examiner.*